(12) United States Patent
Schneider et al.

(10) Patent No.: US 7,047,691 B2
(45) Date of Patent: May 23, 2006

(54) UNBREAKABLE FLEXIBLE LIVE PLANT HOLDER WITH DESIRED DRAINAGE FLOW

(75) Inventors: Kristin Schneider, Cincinnati, OH (US); Tamara More, Cincinnati, OH (US)

(73) Assignee: BelleGarden LLC, Cincinnati, OH (US)

( * ) Notice: Subject to any disclaimer, the term of this patent is extended or adjusted under 35 U.S.C. 154(b) by 51 days.

(21) Appl. No.: 10/838,629

(22) Filed: May 4, 2004

(65) Prior Publication Data

US 2005/0091918 A1 May 5, 2005

Related U.S. Application Data

(60) Provisional application No. 60/566,792, filed on Apr. 30, 2004.

(51) Int. Cl.
*A01G 9/02* (2006.01)

(52) U.S. Cl. ...................................................... 47/65.8

(58) Field of Classification Search ............... 47/41.01, 47/41.1, 41.12, 41.13, 41.14, 41.15
See application file for complete search history.

(56) References Cited

U.S. PATENT DOCUMENTS

| | | | | | |
|---|---|---|---|---|---|
| 2,647,550 | A | * | 8/1953 | Cannon | 383/12 |
| 3,094,810 | A | * | 6/1963 | Kalpin | 47/73 |
| 3,739,522 | A | * | 6/1973 | Greenbaum | 47/87 |
| 4,006,561 | A | * | 2/1977 | Thoma et al. | 47/84 |
| 4,149,339 | A | * | 4/1979 | Hall et al. | 47/67 |
| 4,400,910 | A | * | 8/1983 | Koudstaal et al. | 47/84 |
| 5,127,187 | A | * | 7/1992 | Hattori et al. | 47/59 R |
| 5,315,782 | A | * | 5/1994 | Barclay et al. | 47/41.12 |
| 5,715,629 | A | * | 2/1998 | Hawkins | 47/65.5 |
| 6,041,546 | A | * | 3/2000 | Baranova | 47/65.8 |
| 6,510,651 | B1 | * | 1/2003 | Weder et al. | 47/72 |
| 2003/0044242 | A1 | * | 3/2003 | Chen | 405/302.6 |
| 2005/0166451 | A1 | * | 8/2005 | Stachnik | 47/65.7 |

FOREIGN PATENT DOCUMENTS

GB 2164536 A * 3/1986

* cited by examiner

*Primary Examiner*—Francis T. Palo
(74) *Attorney, Agent, or Firm*—David Bogart Dort; Dort Partners IP PLLC

(57) ABSTRACT

The inventive plant holder is made of at least two layers of cloth like material and configured to hold soil for a live plant for both indoor and outdoor use. The invention allows the plant to be irrigated without detriment to the holder by allowing excess water to drain out a target area, but keeping the soil moist. The holder has an outer layer of material that allows for various types of decorative and custom designs.

14 Claims, 6 Drawing Sheets

(FRONT)

(REAR)

(SIDE)

(FRONT)

(REAR)

(SIDE)

(FRONT)

(SIDE)

(REAR VIEW)

(BAG)

(HANDLE)

(3-4 PLY PLASTIC)

UNBREAKABLE FLEXIBLE LIVE PLANT HOLDER WITH DESIRED DRAINAGE FLOW

REFERERNCE TO PRIORITY DOCUMENTS

The present Application claims priority under 35 U.S.C. §119(e) to U.S. Provisional Application 60/566,792, filed Apr. 30, 2004 in the United States Patent and Trademark Office and entitled UNBREAKABLE FLEXIBLE LIVE PLANT HOLDER WITH OPTIMIZED DRAINAGE FLOW, which is hereby incorporated by reference for all purposes.

SUMMARY OF THE INVENTION

The present invention is currently being sold under the trade name GARDEN BAG™ and can be used as an attractive alternate to ceramic pots for holding plants. The inventive plant holder is made of at least two layers of cloth-like material and configured to hold soil for a live plant for both indoor and outdoor use. The invention allows the plant to be irrigated without detriment to the holder by allowing excess water to drain out a target area while keeping the soil moist. The holder has an outer layer of material that allows for various types of decorative and custom designs.

BRIEF DESCRIPTION OF THE DRAWINGS

The present invention can be best understood by contemplating the following illustrations in which.

DETAILED DESCRIPTION

Figure 6:
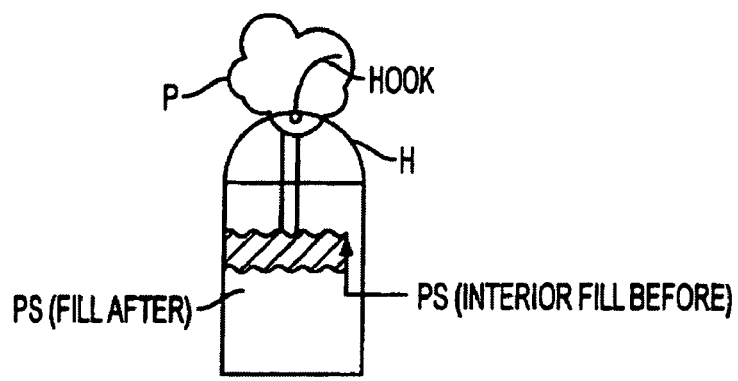
FIG. 6 illustrates a sample implementation of the invention.

FIG. 6 illustrates a sample implementation of one of the embodiments of the invention. The details the sample implementation shown in FIG. 6 are discussed below.

Figure 1A:
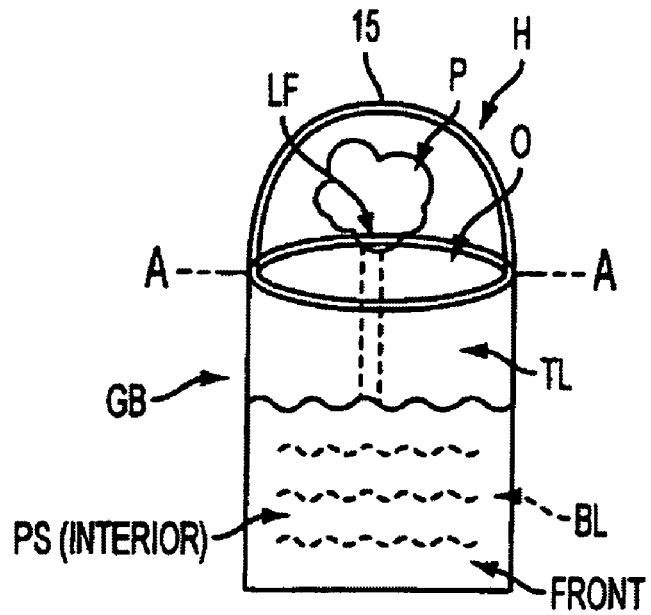
FIG. 1A illustrates a front view of a representative flexible plant holder.
Figure 1B:
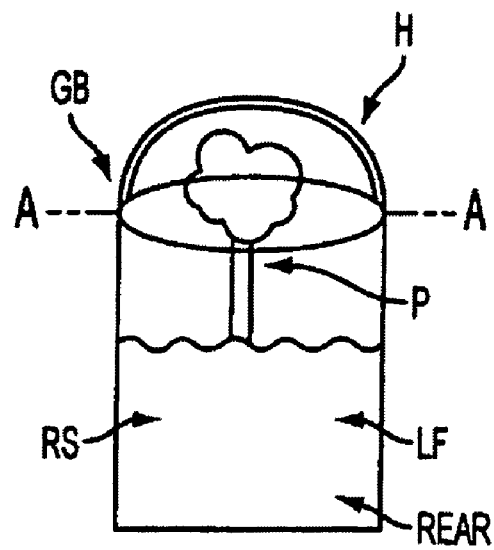
FIG. 1B illustrates a back view of the flexible plant holder.
Figure 1C:
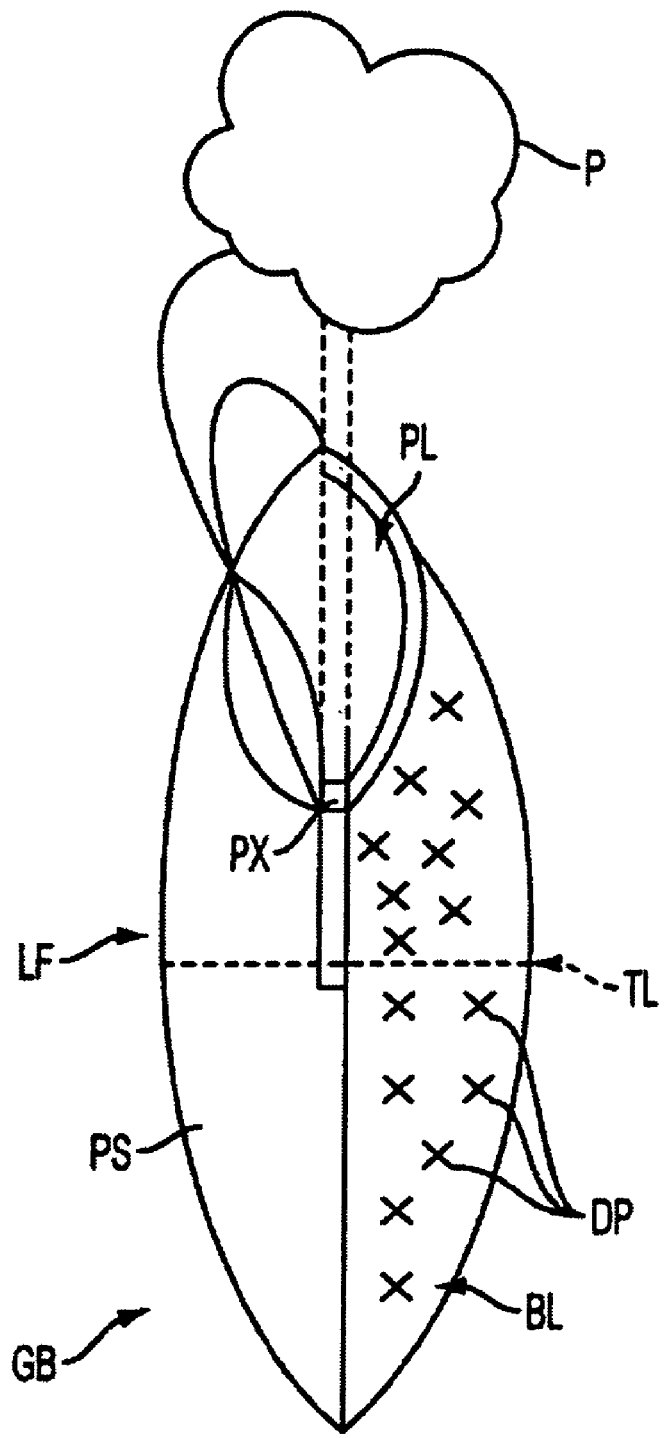
FIG. 1C illustrates a side view of the flexible plant holder and component materials.

Referring now to FIGS. 1A–1C, three views of the present invention are illustrated from the front, rear and side views, respectively. The present invention marketed under the trade name GARDEN BAG™ (shown as GB) is designed to hold soil and a live plant in a manner similar to a flower pot made of ceramic material, but it is flexible and versatile making it a good design choice for both interiors and exteriors. Referring now to FIG. 1A, the front view of the inventive plant holder GB includes a indoor/outdoor fabric in a top layer TL and bottom layer BL that may be decorative in nature and can withstand rain, sun and other elements and may include available fabrics such as SUMBRELLA™ and/or other similar materials. The indoor/outdoor material TL and BL is generally 100 percent acrylic and does not discolor when it gets wet. An additional interior plastic layer PL, usually of 3 or 4 ply plastic in a preferred embodiment is sewn inside the I/O material bottom layer BL and further protects the indoor/outdoor fabric from the bottom I/O material layer BL from the soil or plant support PS located in the interior space IS of the plant holder. A plant P is supported by the plant support and extends above the opening 0, such that the plant P may be viewed.

A semicircular-like handle H is attached at the top of the garden bag GB preferably at the stitch (not shown) between the front and rear at attachment points A which straddle the front and rear panels of the bag. The handle is usually made of a folded over layer of indoor/outdoor material and thread. The assembly of the handle will be discussed below. The handle H usually extends above the plant P height for maximum flexibility, but does not need to as the handle H is flexible like the bag GB and can be moved in any direction. The present invention contemplates different types of handles and lengths thereof in order to accommodate different uses.

Another inventive feature of the present invention is that holder includes a "landscape fabric" used to construct the back panel or LF as shown in FIG. 1B (rear view). The landscape fabric LF allows the user to water the plant normally while excess water drains away, preferably unseen. As a result the soil is kept moist, but not too wet, and the plant's roots are protected. As can be appreciated, the landscape fabric LF is used such that the plant holder may drain, and the entirety of the back panel does not need to be constructed of landscape fabric. Landscape fabric is normally available at large landscaping or home and garden centers.

FIG. 1 C illustrates a side view of a representative embodiment of the inventive plant holder GB. The handle H is attached to the body of the bag at attachments A that are fastened to both the front and the rear panels of the plant holder GB.

Figure 2A:
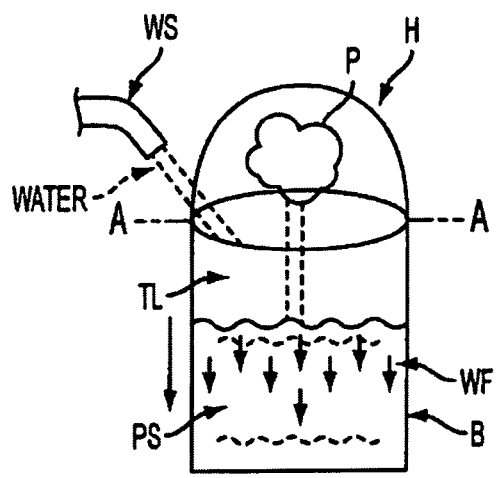
FIGS. 2A and 2B illustrate the irrigation flow of the flexible plant holder at two different temporal points.
Figure 2B:
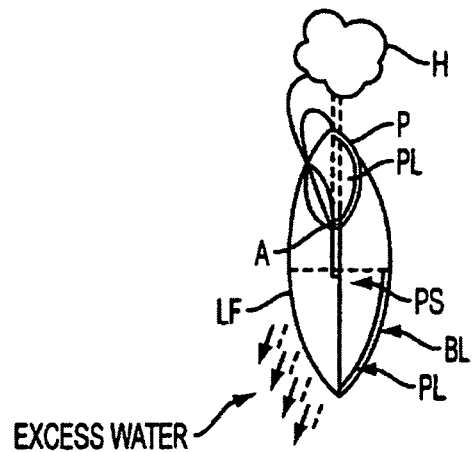

FIGS. 2A and 2B illustrate the versatility of the inventive plant holder and functionality of the drainage and irrigation system for keeping the plant healthy and allowing excess water to drain optimally from the rear of the plant holder. FIG. 2A shows a water source WS as it pours water into the interior space IS and into the plant support PS, which is usually soil. The arrows indicate the water or irrigation flow WF downward.

FIG. 2B shows a side view of excess water, indicated by arrows flowing out of the landscape fabric LF in the rear panel of the plant holder. The plastic layer PL on the interior of the bottom layer of the indoor/outdoor fabric BL prevents the water from damaging the decorative indoor/outdoor fabric and allows the drainage to flow out only one side of the bag, making the plant holder more versatile for decorating purposes.

Figure 3:
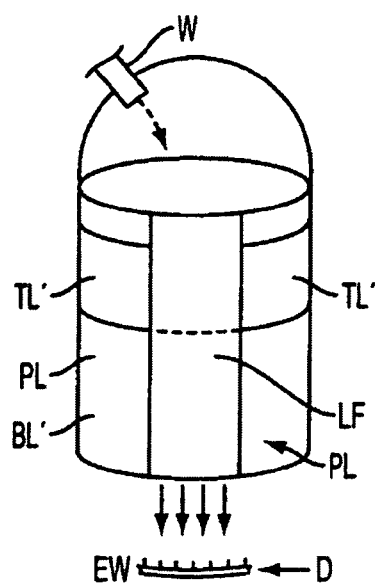
FIG. 3 illustrates an alternate drainage configuration of the inventive plant holder with targeted drainage

Referring now to FIG. 3, an alternate embodiment of the inventive plant holder is shown with an alternately shaped drainage system caused by making a narrower panel of landscaping fabric LF on the back panel. Thus, the indoor/outdoor fabric TL' and BL' extend further around the front panel and the interior plastic lining PL of 3–4 ply plastic extends as well. Thus, the excess water EW is confined to a narrower flow than the preferred embodiment shown above and may be more desirable for purely indoor or more restrictive settings. For example, excess water EW will flow or drop directly into the drain D.

Figure 4A:
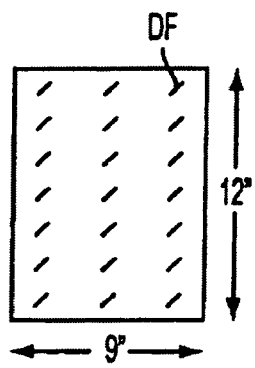
FIGS. 4A–D show the components for the construction of the flexible plant holder.
Figure 4B:
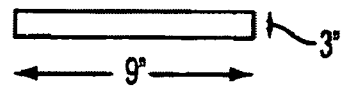
Figure 4C:
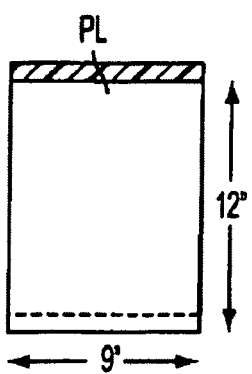
Figure 4D:
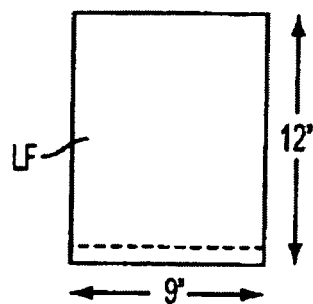

FIGS. 4A–4D illustrate four components for manufacturing the inventive plant holder. FIG. 4A illustrates a sample of indoor/outdoor fabric in a sample size of 12 by 9 inches. The decorative side of the 110 fabric is shown by the representative marks and indicated by label DF. FIG. 4B shows sample dimensions for the handle which may be made of the same material as the I/O fabric or made of a different material. The sample dimensions illustrated are 9 by 3 inches. FIG. 4C shows a sample size of 3 or 4 ply plastic which is cut to be 12 by 9 inches, generally the same size or a bit smaller than the I/O fabric. FIG. 4D shows that the landscape layer LF is cut the same size (for the preferred embodiment) as the I/O material, but may be cut to a different size and shape for purposes of manufacturing the alternate embodiment shown in FIG. 3 and discussed above.

Figure 5A:
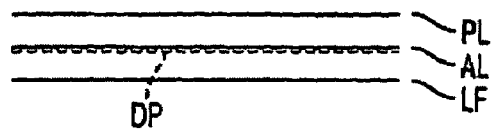
FIGS. 5A–5G illustrate a representative assembly implementation for making the invention.
Figure 5B:
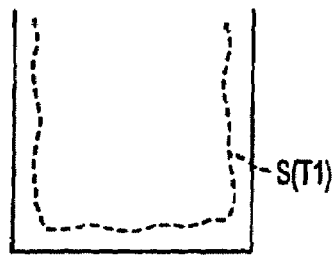
Figure 5C:
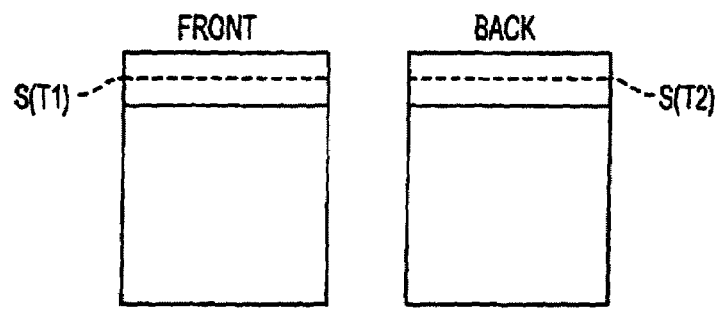

FIGS. 5A–5G illustrate the assembly process used in making the present invention. FIG. 5A shows that the plastic layer PL is placed above the indoor/outdoor layer AL, which is placed decorative face DF down. The two layers are then placed over the landscaping fabric LF. In the step illustrated by FIG. 5B, the three layers are sewn together on three sides while the bag is still inside-out showing the stitch line S (t1). FIG. 5C shows a step in which the top of the bag is folded over approximately one inch and sewn all the around at second stitch point S (t2). This creates a finished top edge while the bad is still inside-out. The plastic layer is sewn to the side of the acrylic fabric and the top of the bag is left open so that items may be inserted.

Figure 5D:
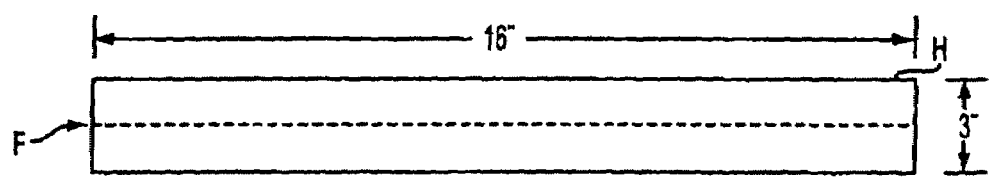
Figure 5E:
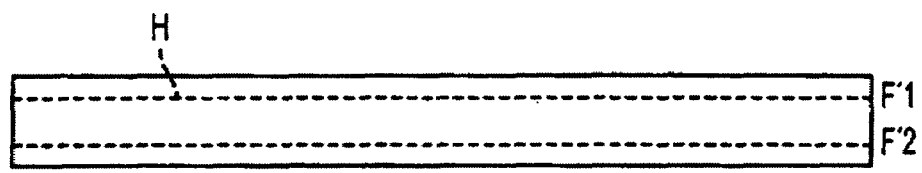
Figure 5F:
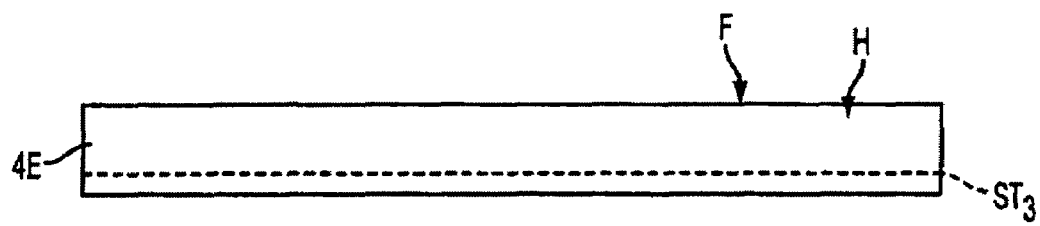
Figure 5G:
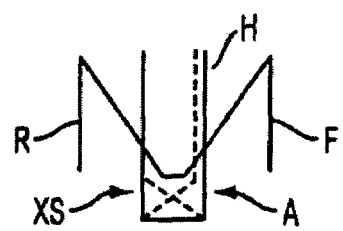

FIGS. 5D–5F shows the manufacture of the handle H. In FIG. 5D, the handle strip of indoor material is folded and preferably ironed at center part F. In FIG. 5E, the strip is then folded at second handle folds F1 and F2 which creates two outside panels. The outside panels are then folded into the middle and optimally will meet. The handle material is then folded down the center and sewn down the open side along stitch line S (t3), which is shown by FIG. 5F. The unfinished edge is then folded under itself and the handle is then attached to the bag where the front F and rear or back R panels meet "X" pattern stitch XS, creating an inch on both sides. This step is shown by FIG. 5G.

As can be appreciated by artisans, the functional features of the present invention may be achieved by materials and manufacturing techniques, such as alternate cuts, folds or stitches which are not illustrated herein, but which are within the scope of the present invention. The above examples, especially dimensions are meant to be illustrative to the artisan. The scope of the invention should therefore be determined by reference to the following claims.

We claim:

1. A flexible holder for a live plant including: a continuous front panel of a flexible material, said front panel-made of an indoor/outdoor material; configured such that the interior of said front panel is lined with a layer of durable waterproof material; said front panel attached to a continuous rear panel of landscaping material, said landscaping material having the property of allowing water to flow from the interior to the exterior, wherein said front panel and said rear panel are attached at the three sides of each of said respective front and rear panels, and such that plant supporting material may be placed into the interior formed thereof;

wherein said waterproof material is configured such that the interior of said front panel does not get wet when water is poured into said interior of said holder; and a handle made of flexible material.

2. The flexible plant holder recited in claim 1 wherein said indoor/outdoor material is decorative.

3. The flexible plant holder recited in claim 1 wherein said handle is attached with an "X" stitch.

4. The flexible plant holder recited in claim 1, wherein said handle is configured such that it is folded over.

5. The flexible plant holder recited in claim 1, wherein said indoor/outdoor material includes acrylic.

6. A portable unbreakable holder for a live plant including: a first panel of indoor/outdoor material lined with waterproof plastic; a second panel of landscaping fabric attached to said first panel on three sides such that a top opening of an interior is formed and capable of holding soil, said landscaping fabric configured to allow water to flow from said top opening to outside said landscaping fabric panel; wherein said first panel is larger than said second panel and said second panel is cut such that it results in a desired external drainage region for excess water when water is poured into said soil in said interior; and a flexible semicircular handle attached to said first panel.

7. The live plant holder as recited in claim 6, wherein said indoor/outdoor material is patterned.

8. The live plant holder as recited in claim 6, wherein said indoor/outdoor material is acrylic.

9. The live plant holder as recited in claim 6, wherein said handle is made of the same material as said first panel of indoor/outdoor material.

10. The holder as recited in claim 1, wherein said handle is attached to both said front and rear panels outer material and said rear panel, such that said holder may be safely hung.

11. The holder as recited in claim 1, wherein said handle is made of the same material as said front panel.

12. The holder as recited in claim 1, wherein said front panel is substantially rectangular.

13. The holder as recited in claim 1, wherein said rear panel is substantially rectangular.

14. The holder as recited in claim 1, wherein said panels are approximately the same surface area.

* * * * *